United States Patent
Methe et al.

(10) Patent No.: US 8,650,716 B1
(45) Date of Patent: Feb. 18, 2014

(54) METHODS AND APPARATUS FOR MINIMIZING CONTAMINATION IN HARD DISK DRIVE ASSEMBLY PROCESSES

(75) Inventors: Joseph A. Methe, San Jose, CA (US); Drew G. Petitclerc, San Jose, CA (US); Charles D. Flanigan, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 134 days.

(21) Appl. No.: 13/324,576

(22) Filed: Dec. 13, 2011

(51) Int. Cl.
*B25G 3/32* (2006.01)

(52) U.S. Cl.
USPC ............... 16/422; 360/99.15; 360/99.2

(58) Field of Classification Search
USPC ............ 16/422, 110.1, 425, 427, 429, 430; 360/97.11, 99.15, 99.16, 99.18, 99.2; 15/145; 220/759
See application file for complete search history.

(56) References Cited

U.S. PATENT DOCUMENTS

| | | | |
|---|---|---|---|
| 4,697,303 A * | 10/1987 | Matsui et al. | 16/438 |
| 5,751,514 A * | 5/1998 | Hyde et al. | 360/97.21 |
| 6,629,329 B1 * | 10/2003 | Webb et al. | 15/209.1 |
| 7,220,323 B2 * | 5/2007 | Hashi et al. | 134/6 |
| 7,574,768 B2 * | 8/2009 | Morris et al. | 15/145 |
| 7,983,000 B2 | 7/2011 | Chen et al. | |
| 8,493,685 B2 * | 7/2013 | Choi | 360/97.11 |

* cited by examiner

*Primary Examiner* — William Miller

(57) ABSTRACT

A removable tool for reducing contamination in a cleanroom assembly environment during assembly of a hard disk drive may include a handle assembly and a positive locking assembly. The handle assembly may define a proximal and distal end such that, in use, the proximal end is further away from the hard disk drive being assembled than is the distal end. The positive locking assembly may be configured to lock onto a portion of an upper perimeter of a Motor Base Assembly (MBA) of a hard disk drive and onto a corresponding portion of a lower perimeter of the MBA. The handle assembly and the positive locking assembly may be further configured to enable free access to an interior of the MBA during subsequent assembly steps. The positive locking assembly may be further configured to be selectively releasable without touching the MBA, to thereby enable the removal of the tool.

10 Claims, 6 Drawing Sheets

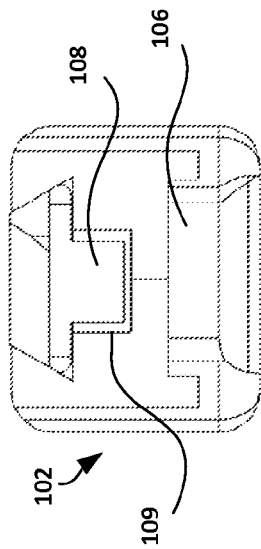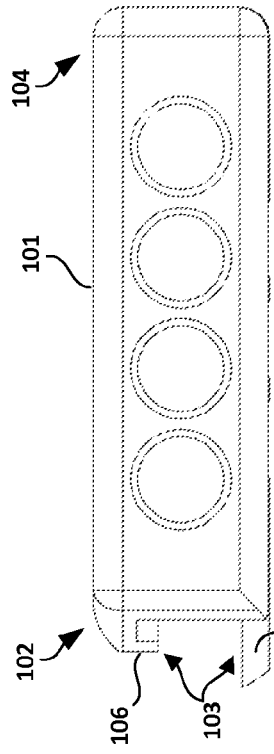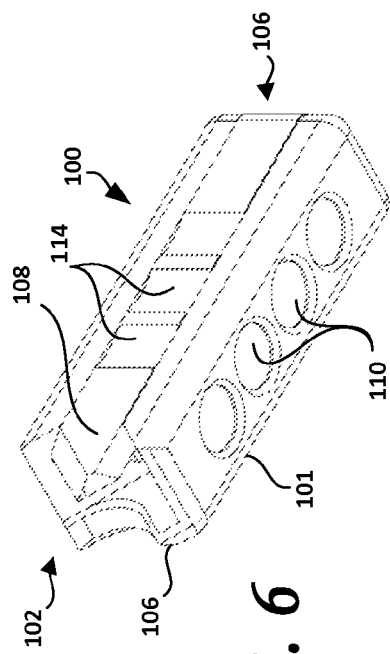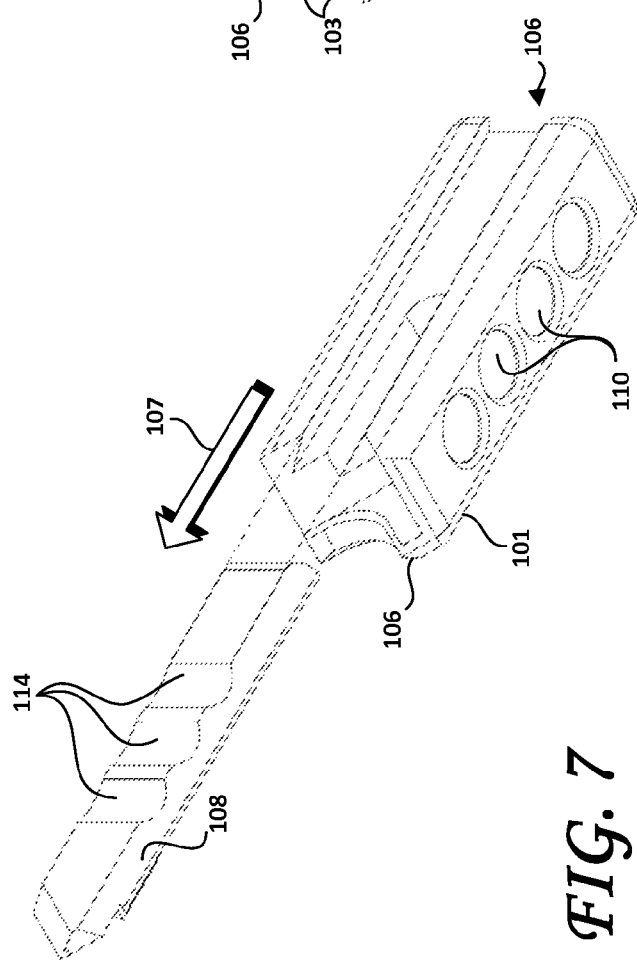

METHODS AND APPARATUS FOR MINIMIZING CONTAMINATION IN HARD DISK DRIVE ASSEMBLY PROCESSES

BACKGROUND OF THE INVENTION

Hard disk drives are assembled in a semi-automated assembly process, in which the hard disk drives being assembled are moved from station-to-station, where the constituent elements thereof are added and assembled together until the assembly of the drives is complete. If this process is not carried out on a conveying system in a common carrier, it will be touched many times by either a gripper or human hands. Even in a cleanroom environment, human hands (whether gloved or bare) are relatively dirty and contribute significantly to drive contamination via, for example fingerprints and/or particulate matter. When trays are used to transport the constituent parts of the drives from place to place, movement within the tray can also become a source of contamination. At each of the stages at which the drives are touched and handled, is handling damage and contamination are likely.

What are needed, therefore, are devices and methods for assembling hard disk drives that reduce the incidence and severity of contamination and damage.

SUMMARY OF THE INVENTION

An embodiment of the present inventions is a removable tool for reducing contamination in a cleanroom assembly environment during assembly of a hard disk drive. The removable tool may include a handle assembly and a positive locking assembly. The handle assembly may define a proximal and distal end such that, in use, the proximal end is further away from the hard disk drive being assembled than is the distal end. For example, the positive locking assembly may form part of or may be coupled to or the proximal end of the handle assembly. Alternatively, the positive locking assembly may form part of or may be coupled to another portion of the handle assembly. The positive locking assembly may be configured to lock onto a portion of an upper perimeter of a Motor Base Assembly (MBA) of a hard disk drive and onto a corresponding portion of a lower perimeter of the MBA. The handle assembly and the positive locking assembly may be further configured to enable free access to the interior of the MBA during subsequent assembly steps. The positive locking assembly may be further configured to be selectively releasable without touching the MBA, to thereby enable the removable tool to be removed from the MBA.

According to further embodiments, the positive locking assembly may be (but need not be) integrated with the handle assembly at or near the distal end thereof. The positive locking assembly may be coupled to the distal end of the handle assembly. All or a portion of the handle assembly and of the positive locking assembly may be configured to be cleaned and re-used. The positive locking assembly may be configured to lock onto portions of the upper perimeter and lower perimeter of the MBA that define a corner of the MBA. The positive locking assembly may include a top hooked portion integrated with the handle assembly and a bottom sliding member that may be configured to slide in a distal direction until a positive lock may be made with the MBA. The handle assembly may be formed of or may include a polymer. The handle assembly may define at least one prehensile-facilitating surface feature. The handle is assembly may be configured to be grasped by a machine and/or a human hand.

Another embodiment of the present inventions is a method of reducing contamination in a cleanroom assembly environment during assembly of a hard disk drive. The method may include steps of manually locking a removable tool onto the hard disk drive being assembled, the removable tool including a handle assembly defining a proximal end and a distal end such that the proximal end, in use, is further away from the hard disk drive being assembled than is the distal end, the removable tool including a positive locking assembly that may form part of or may be coupled, for example, to the proximal end (or any other portion) of the handle assembly; carrying out at least one assembly step on the hard disk drive with the positive locking assembly locked thereon, the (one or more) assembly steps being carried out without manually touching the hard disk drive being assembled, and unlocking the positive locking assembly and removing the removable tool from the hard disk drive being assembled.

According to further embodiments, the locking step may be carried out with the positive locking assembly being configured to lock onto a portion of an upper perimeter of a Motor Base Assembly (MBA) of the hard disk drive being assembled and onto a corresponding portion of a lower perimeter of the MBA. The locking step may be carried out with the handle assembly and the positive locking assembly being configured to enable free access to the interior of the hard disk drive being assembled during subsequent assembly steps and with the positive locking assembly being configured to be selectively releasable without manually touching the hard disk drive being assembled. The locking step may be carried out with the positive locking assembly being integrated with the handle assembly at or near, for example, the distal end (or any other portion) thereof. The locking step may be carried out with the positive locking assembly being coupled to the distal end of the handle assembly. The locking step may be carried out with all or a portion of the handle assembly and of the positive locking assembly being configured to be cleaned and re-used. The locking step may be carried out with the positive locking assembly being configured to lock onto a corner of the Motor Base Assembly (MBA). The locking step may be carried out with the positive locking assembly including a top hooked portion integrated with the handle assembly and a bottom sliding member that configured to slide in a distal direction until a positive is lock is made with the hard disk drive being assembled. The locking step may be carried out with the handle assembly being formed or including a polymer. The locking step may be carried out with the handle assembly defining one or more prehensile-facilitating surface features. The locking step may be carried out with the handle assembly being configured to be grasped by a machine and/or human hands.

BRIEF DESCRIPTION OF THE DRAWINGS

FIG. 6 shows a perspective view of a removable tool for reducing contamination in a cleanroom assembly environment during assembly of a hard disk drive, according to an embodiment of the present inventions.

FIG. 7 shows a perspective view of a removable tool for reducing contamination in a cleanroom assembly environment during assembly of a hard disk drive, in which the bottom sliding member is slid in the distal direction, to illustrate further aspects of an embodiment of the present inventions.

FIG. 8 shows a front view of a removable tool for reducing contamination in a cleanroom assembly environment during assembly of a hard disk drive, illustrating further aspects of an embodiment of the present inventions.

FIG. 9 shows a side view of a removable tool for reducing contamination in a cleanroom assembly environment during assembly of a hard disk drive, illustrating further aspects of an embodiment of the present inventions.

DESCRIPTION OF THE PREFERRED EMBODIMENTS

Figure 1:
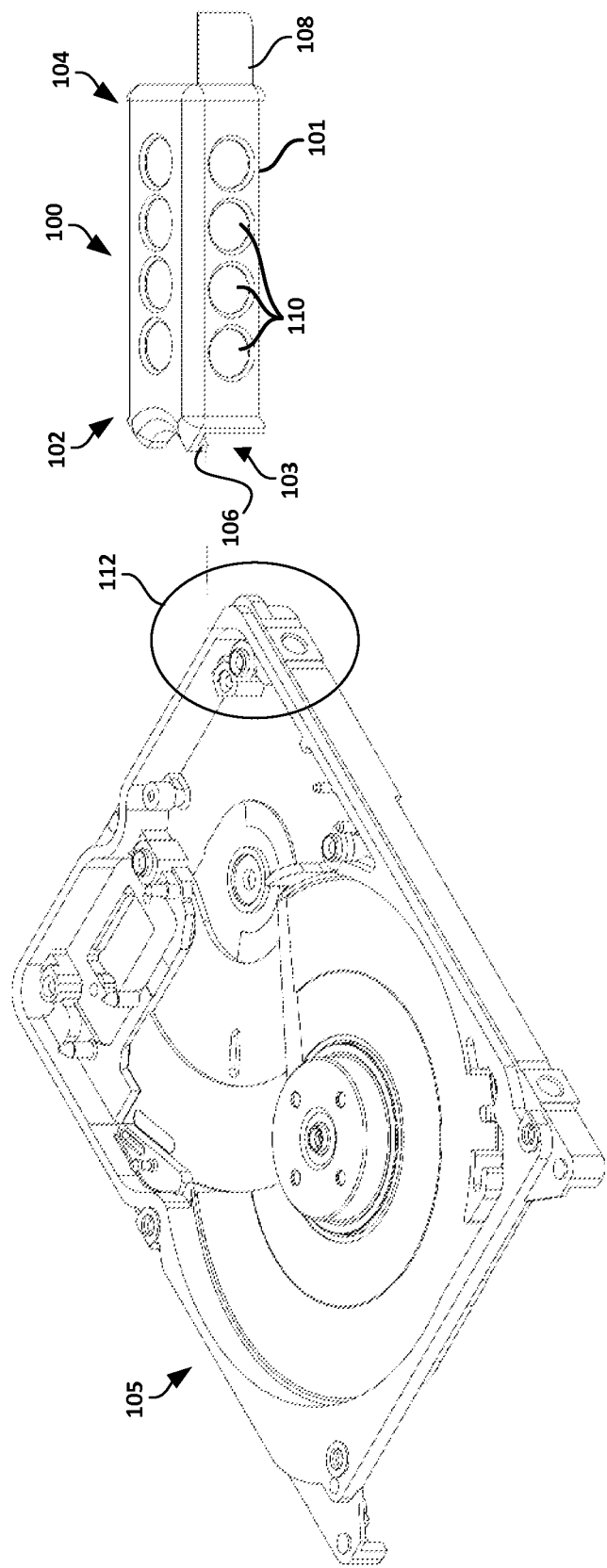
FIG. 1 shows a Motor Base Assembly (MBA) and a removable tool for reducing contamination in a cleanroom assembly environment during assembly of a hard disk drive, according to embodiments of the present inventions, in a state either before the present removable tool has been locked onto the MBA or after the present removable tool has been unlocked therefrom and removed from the hard disk drive being assembled.
Figure 2:
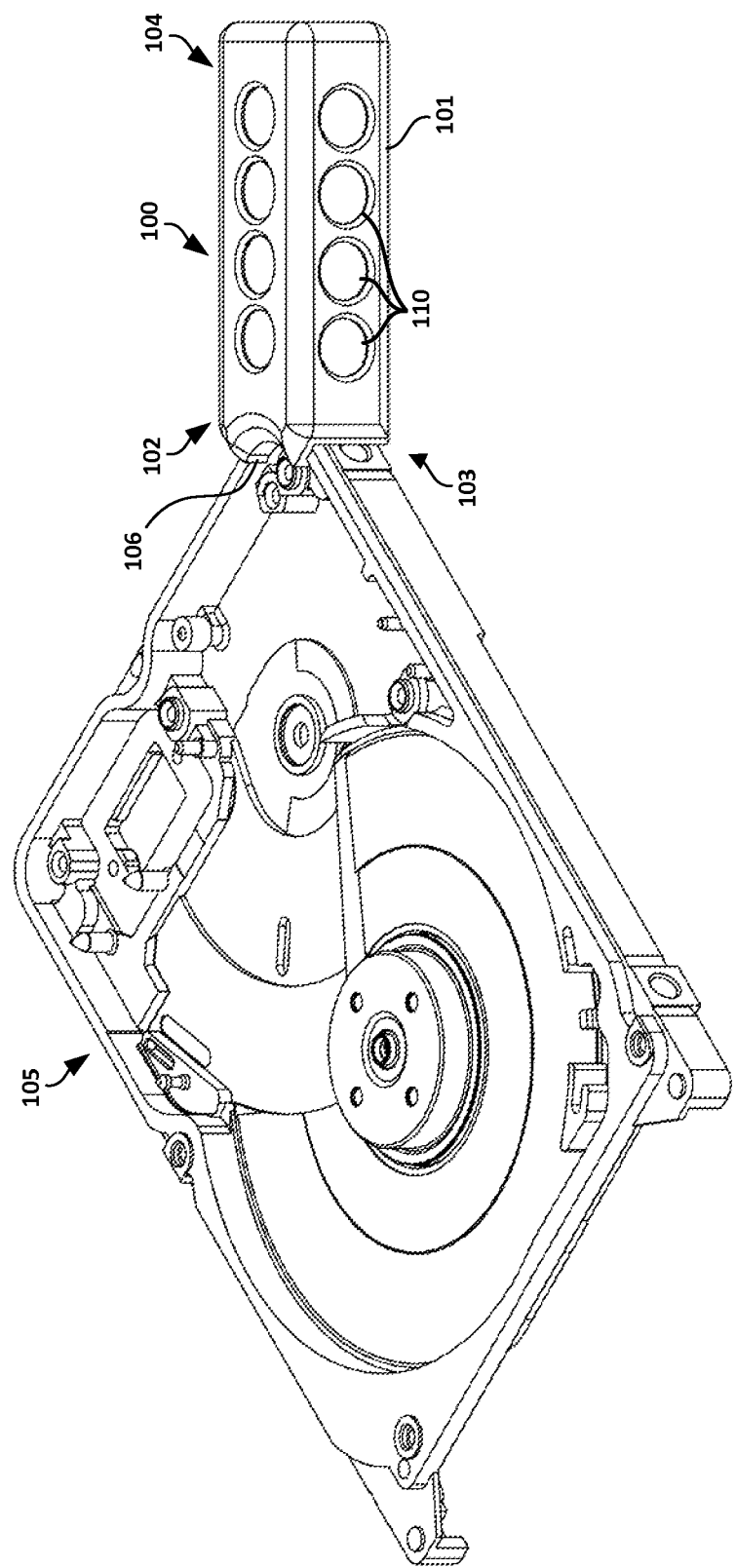
FIG. 2 shows the MBA and the present removable tool of FIG. 1, according to an embodiment of the present inventions, in a state after the present removable tool has been locked onto the MBA.

FIG. 1 shows an MBA 105 and a removable tool 100 for reducing contamination in (for example) a cleanroom assembly environment during assembly of a hard disk drive, according to embodiments of the present inventions. FIG. 1 shows the MBA 105 and the removable tool 100 in a state either before the present removable tool 100 has been locked onto the MBA 105 or after the present removable tool 100 has been unlocked therefrom and removed from the disk drive being assembled. As shown, the MBA 105 may be a bare hard disk drive base or include the base and other hard disk drive components. Embodiments of the present inventions, therefore, may be used to good advantage at most any stage of the hard disk drive assembly process. As shown, the present removable tool 100 may be of generally rectangular shape and may, for example, have a cross-section that defines two pairs of substantially parallel facing surfaces. To make the present removable tool more comfortable to grasp by human hands, the hard edges formed by adjacent surfaces may be softened by, for example, including intervening narrow surfaces having a 45 degree angle with respect to each of the adjacent surfaces. It is, however, to be noted that the present removable tool 100 may be fabricated to have other cross sectional shapes, such as a circle or oval. The shape of the present removable tool may be freely adapted according to the demands placed thereon. For example, the removable tool may be made shorter or longer or may be made to conform to a particular mechanical gripper, if the present removable tool is to be used by an automated or semi-autonomous machine.

As shown in FIGS. 1-9, the present removable tool 100 may include a handle assembly 101 and a positive locking assembly 103. The handle assembly 101 defines a proximal end 104 and distal end 102 such that, in use, the proximal end 104 is further away from the hard disk drive being assembled (e.g., the MBA 105 and any other is components that have thus far been assembled thereon) than is the distal end 102.

The positive locking assembly 103 may be formed as part of or may be coupled to the handle assembly 101, anywhere along its extent. In the following description, the positive locking assembly is 103 is described and shown as being formed at or coupled to or near the distal end 102 of the handle assembly. However, it is to be understood that the embodiments of the present inventions are not so limited and that the positive locking assembly may be formed at or may be coupled to most any portion of the removable tool 100. All or a part of the positive locking assembly 103 may be integrally formed with the handle assembly 101. For example, all or a part of the positive locking assembly 103 may be formed at the same time and with the same mold or casting as the handle assembly 101. According to embodiments of the present inventions, the locking assembly 103 is a "positive" locking assembly. Within the present context, the term "positive", when used in conjunction with the locking assembly 103, denotes a locking assembly that requires some intentional action on the part of the human or machine operator in order to effectuate the lock of the present removable tool 100 onto the MBA 105. Also, the term "positive", when used in conjunction with the locking assembly 103 of embodiments of the present inventions, denotes a locking assembly that will not, under normal circumstances and use, become unlocked, without an intervening purposeful human or machine action to unlock the positive locking assembly 103 from the MBA 105.

The present removable tool may be configured to lock onto a portion of an upper perimeter of a MBA 105 and onto a corresponding portion of a lower perimeter of the MBA 105. The positive locking assembly 103, according to an embodiment of the present inventions, is advantageously configured so as to as unobtrusive as possible during the HDD assembly process. That is, the positive locking assembly 103 and the present removable tool 100 in general, may be configured to enable free access to the interior of the MBA 105 during subsequent assembly steps. The positive locking assembly 103 is further preferably configured to be selectively releasable (by human hands and/or a machine gripper or manipulator) without touching the MBA 105, to thereby enable the removable tool 100 to be removed from the MBA 105 without contaminating the drive being assembled.

As suggested by FIG. 1, the positive locking assembly 103 may be configured to lock onto a portion of an upper perimeter of a MBA 105 and onto a corresponding portion of a lower perimeter of the MBA 105 that define a corner thereof, as referenced at 112. Locking onto a corner 112 of the MBA 105, as most clearly shown in FIGS. 2 and 5, has been found to enable free access to the interior of and free manipulation of the MBA 105 without, however, hindering subsequent hard disk drive assembly steps. However, it is to be understood that the positive locking assembly 103 may be configured to lock onto most any portion of the MBA 105, consistent with the need to enable free access to the interior of the MBA 105 and free manipulation of the MBA 105 during any subsequent assembly steps.

Figure 3:
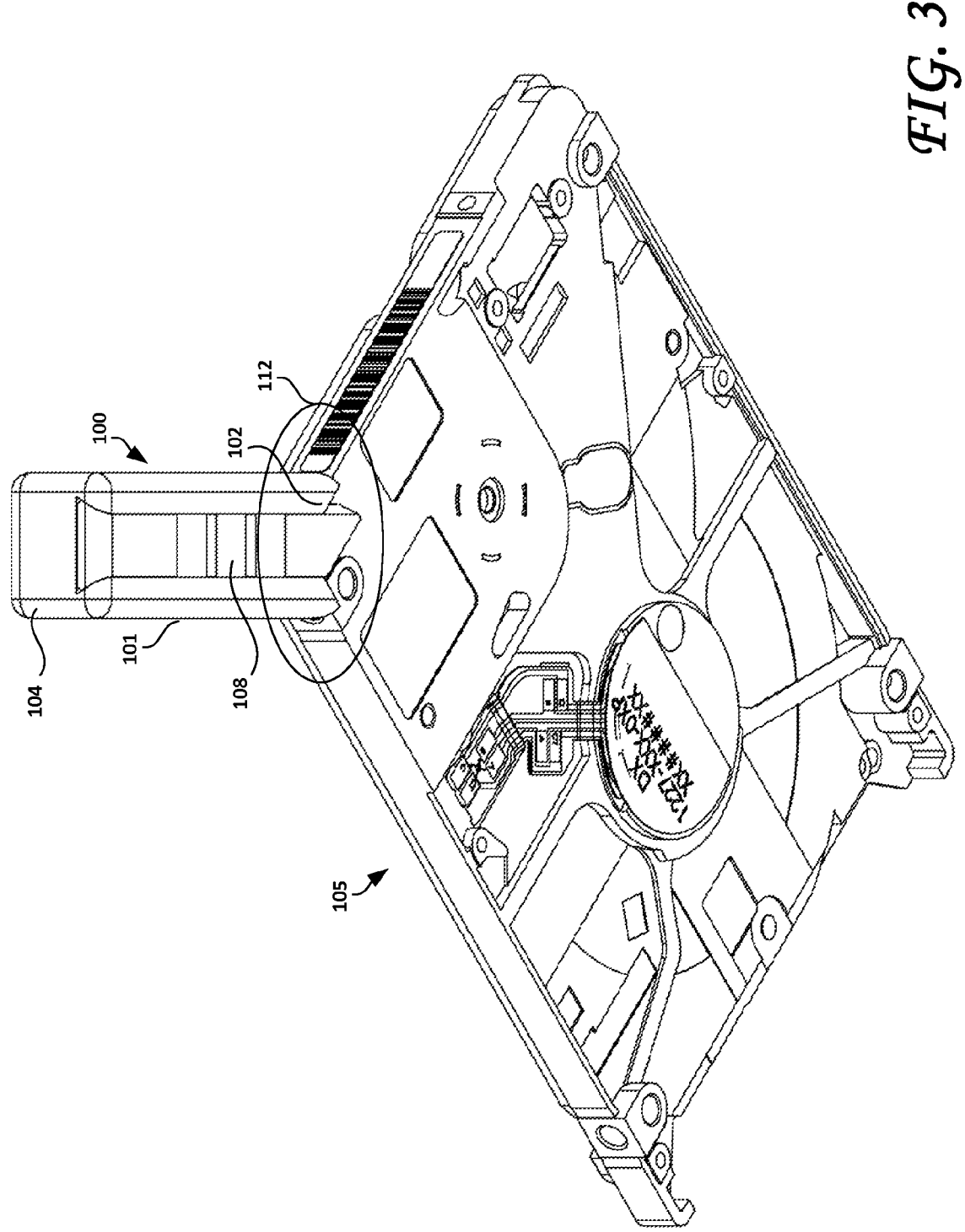
FIG. 3 shows a view of the underside of the MBA and of the present removable tool locked thereon, according to an embodiment of the present invention.
Figure 4:
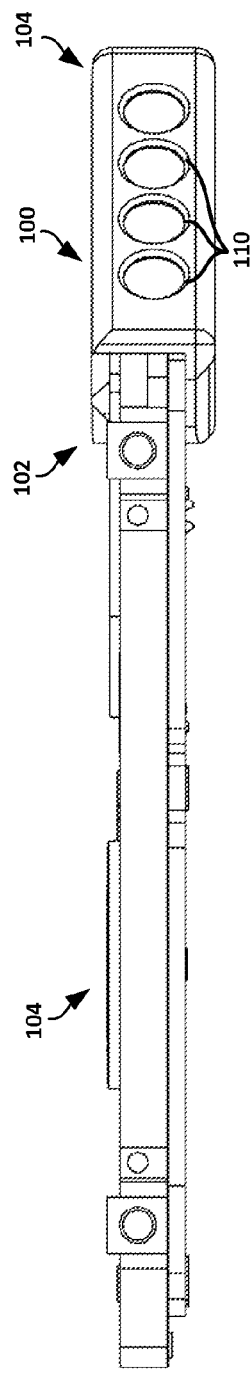
FIG. 4 shows a side view of the MBA and of the present removable tool locked thereon, according to an embodiment of the present invention.
Figure 5:
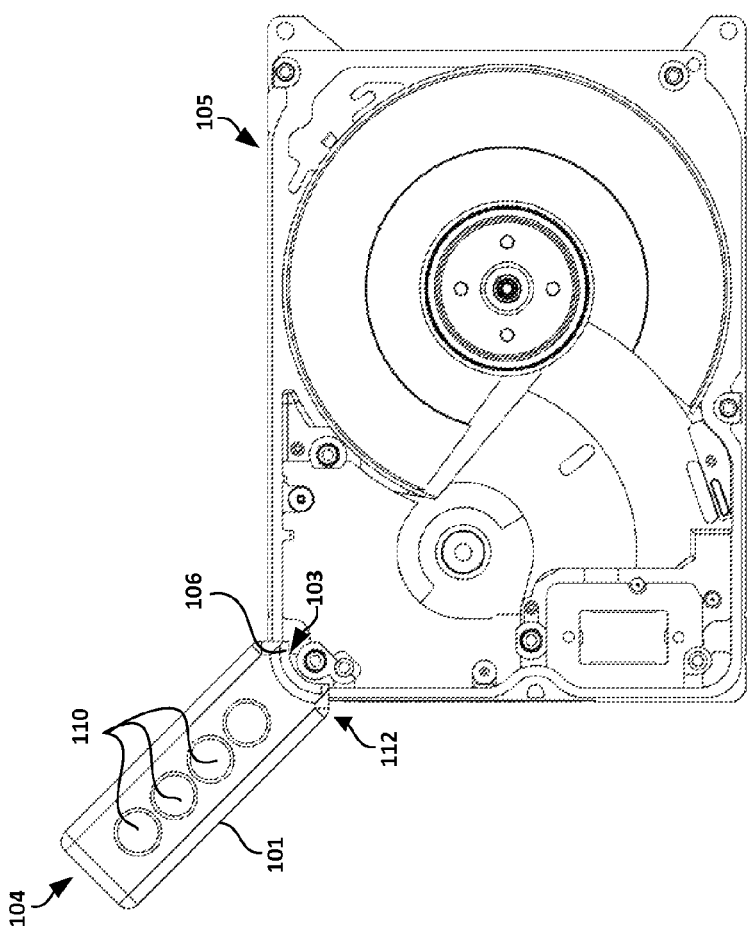
FIG. 5 shows a top view of the MBA and of the present removable tool locked thereon, according to an embodiment of the present invention.

The present positive locking assembly 103 may include virtually any design and structure that is effective to cause the present removable tool 100 to positively lock and unlock from the MBA 105 in a secure and convenient manner. The figures show one of many such possible designs. As shown, the positive locking assembly 103 assembly may include a top hooked portion 106 at or near the distal end 102 of the removable tool 100. The top hooked portion 106 may be configured to hook over the top perimeter of the MBA 105. The top hooked portion 106 may be integrated with the handle assembly 101 or otherwise coupled thereto. The exemplary positive locking assembly 103 may also include a bottom sliding member 108 (as also shown in FIGS. 3 and 6-9) that is configured to slide in a distal direction until a positive lock is made with the MBA 105. The bottom sliding member 108 may include a projection that detents into a corresponding feature on the bottom of the MBA 105 or may simply lock the removable tool 100 onto the MBA by a tight friction fit with the underside of the MBA 105, as shown in FIG. 3. That is, the bottom sliding member 108, when slid in the distal direction (i.e., 107 in FIG. 7) under the MBA 105, may constrain the top hooked portion 106 onto the upper perimeter of the MBA 105, thereby effectuating a positive lock of the present removable tool 100 onto the MBA 105. That positive lock may be maintained until an operator either retracts the bottom sliding member 108 back to its original position within the handle assembly 101 or is pushed in the distal direction 107 completely out of the handle assembly 101, such that the top hooked portion 106 may be disengaged from the upper perimeter of the MBA 105. Other positive locking is methods and mechanisms may be employed, without departing from the scope of the present inventions.

To facilitate grasping the present removable tool 100, the handle assembly 101 may include or define one or more prehensile-facilitating surface features 110. As shown in the figures, the prehensile-facilitating surface features 110 may include local depressions and/or other raised surface features. In the figures, such local depressions are circular in form, although most any shape that facilitates an operator (whether human or machine) grasping the handle assembly 101 may be used.

Likewise, to facilitate the sliding of the bottom sliding member 108 in either the proximal or distal directions, the outward-facing surface of the bottom sliding member 108 may define a number of surface features, such as shown at 114 in FIGS. 6 and 7. Such surface features 114 may be configured to facilitate, for example, a human thumb or other machine manipulator to push against the bottom sliding member 108, to thereby urge the bottom sliding member 108 in either the proximal or distal directions (the distal direction 107 being shown in FIG. 7).

As shown in FIG. 8, the bottom sliding member 108 may be received within a mating track 109 within the handle assembly 101 of the present removable tool 100. This track 109 enables the bottom sliding member 108 to slide (with a desired amount of friction to give the operator some measure of tactile feedback) in the distal direction 107 to lock the present removable tool 100 onto the MBA 105. The bottom sliding member 108 may also be slid in the proximal direction (i.e., in a direction that is opposite to the distal direction 107) fully within the handle assembly 101 or fully in the distal direction 107 and out of the track 109 to enable the present removable tool 100 to be unlocked and removed from the MBA 105.

The handle assembly 101 may be formed of or include a polymer such as a high-impact, hard and particulate free plastic material. Forming the handle assembly 101 (and/or the positive locking assembly 103) of a plastic material is advantageous, as such material is inexpensive to manufacture, durable, and does not shed particulates under normal use. However, the removable tool 100 may also be formed of or include other suitable materials such as, for example, aluminum. Such materials are also susceptible to being cleaned, thereby enabling the present removable tool 100 to be is repeatedly cleaned and re-used, at least for a limited number of assembly cycles. The limiting factor on re-using the present removable tool 100 is likely to be wear-and-tear on the positive locking assembly 103, since that portion of the present removable tool 100 is the portion that makes contact with the corner of the MBA 105.

Figure 10:
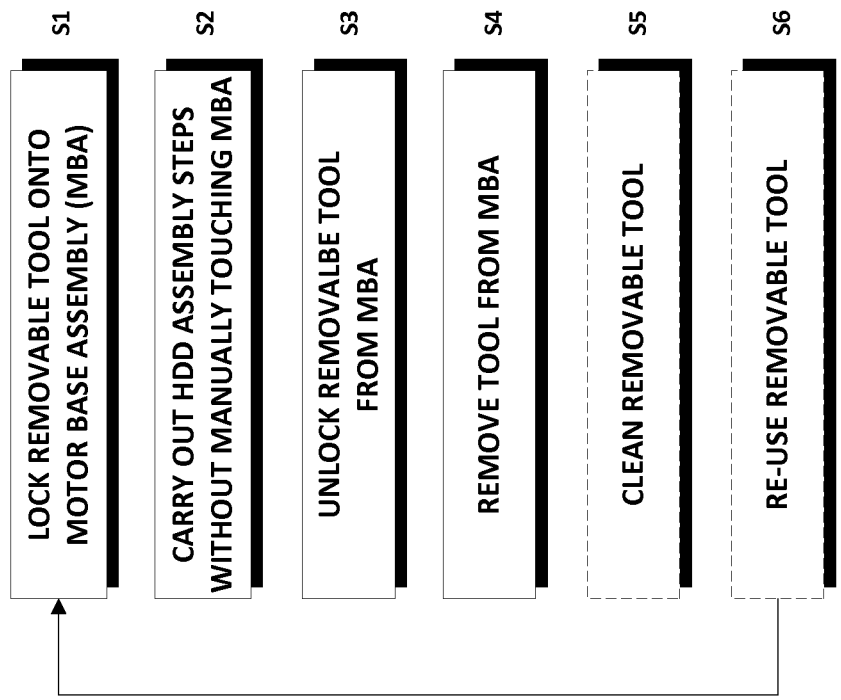
FIG. 10 shows a flowchart of a method reducing contamination in a cleanroom assembly environment during assembly of a hard disk drive, according to another embodiment of the present inventions.

FIG. 10 shows a flowchart of a method reducing contamination in a cleanroom assembly environment during assembly of a hard disk drive, according to another embodiment of the present inventions. As shown therein step, S1 calls for (e.g., manually or by machine) locking a removable tool (as described herein and as shown, for example, in FIGS. 1-9) onto the hard disk drive being assembled. For example, the present removable tool may be securely locked onto the MBA of the disk drive under assembly. According to an embodiment of the present inventions, the removable tool may be positively locked at a corner of the MBA by locking onto, for example, a portion of the upper perimeter of the MBA and a corresponding portion of the lower perimeter of the MBA. The positive lock may be effectuated by a locking assembly as shown and as described herein. Alternatively, the positive locking of the present removable tool onto the MBA may be effectuated by most any suitable locking mechanism, as those of skill in this will readily recognize. Indeed, the precise structure of the locking assembly or mechanism of the present removable tool is of comparatively lesser importance than the primary functionality thereof; namely, to enable a secure positive lock on the MBA that is effective to enable an operator (human or machine) to securely and freely manipulate the drive by grasping the handle assembly alone during at least one (and preferably more than one) subsequent assembly step, without touching the MBA and, more importantly, the interior thereof.

As shown in FIG. 10, step S2 includes carrying out one or more hard disk drive assembly steps without manually (by a machine or human) touching the MBA. Indeed, even a gloved human hand can and does contaminate an MBA of a disk drive under assembly. Such steps may include, for example, installing the VCM (voice coil motor), actuator assembly, ramp load, disk pack and other components of the HDD such as the Printed Circuit Board Assembly (PCBA) thereof. According to an embodiment of the present inventions, such assembly steps include most if not all of the steps from the provision of the bare MBA up to the provision and affixation of the drive top cover and is the sealing of the drive. However, carrying out a lesser number of such steps squarely falls within the scope of the present inventions.

After one or more HDD assembly steps have been carried out with the present removable tool securely locked onto the HDD being assembled, step S3 may be carried out; namely, to unlock the present removable tool from the HDD being assembled. For example, the bottom sliding member 108 may be slid in the distal direction 107 (FIG. 7) until it disengages from the handle assembly 101 of the removable tool 100, unlocks the locking assembly 103 and frees the present removable tool 100 from the MBA 105, which may now be removed, as shown at S4. It is to be recognized that other unlocking actions may be taken, according to the exact structure of the locking assembly. Additionally, intervening steps may also be taken, without departing from the scope of the present inventions.

According to embodiments of the present inventions, and as suggested at steps S5 and S6, the present removable tool may be configured such that at least a portion thereof is susceptible to being cleaned and re-used, at least for a limited number of HDD assembly cycles. For example, aluminum and/or plastic may be used with good results for at least a portion of the present removable tool, as such materials are inexpensive and may be formed such that they are substantially particulate free and sufficiently inelastic and strong as to support the increasing weight of the HDD at various points in its assembly.

Advantageously, embodiments of the present invention reduce contamination in a cleanroom assembly environment. Moreover, by providing a secure and easily grasped handle for manipulating the MBA 105, embodiments of the present inventions reduce the number of dropped and damaged drives during assembly operations, thereby increasing yield and reducing assembly cycle time.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The is accompanying claims and their equivalents are intended to cover such forms or modifications as would fall within the scope and spirit of the inventions. For example, those skilled in the art will appreciate that in various embodiments, the actual structures (such as, for example, the structure of the locking assembly) and the actual steps taken may differ from those shown in the figures. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A removable tool for reducing contamination in a cleanroom assembly environment during assembly of a hard disk drive, comprising:

a handle assembly, the handle assembly defining a proximal and distal end such that, in use, the proximal end is further away from the hard disk drive being assembled than is the distal end; and a positive locking assembly, the positive locking assembly being configured to lock onto a portion of an upper perimeter of a Motor Base Assembly (MBA) of the hard disk drive and onto a corresponding portion of a lower perimeter of the MBA;

wherein the handle assembly and the positive locking assembly enable free access to an interior of the MBA during subsequent assembly steps and wherein the positive locking assembly is selectively releasable without touching the MBA, to thereby enable the removable tool to be removed from the MBA.

2. The removable tool of claim 1, wherein the positive locking assembly is integrated with the handle assembly at or near the distal end thereof.

3. The removable tool of claim 1, wherein the positive locking assembly is coupled to the distal end of the handle assembly.

4. The removable tool of claim 1, wherein the at least a portion of the handle assembly and of the positive locking assembly is configured to be cleaned and re-used.

5. The removable tool of claim 1, wherein the positive locking assembly is configured to lock onto portions of the upper perimeter and lower perimeter of the MBA that define a corner of the MBA.

6. The removable tool of claim 1, wherein the positive locking assembly includes a top hooked portion integrated with the handle assembly and a bottom sliding member that is configured to slide in a distal direction until a positive lock is made with the MBA.

7. The removable tool of claim 1, wherein the handle assembly is formed of or includes a polymer.

8. The removable tool of claim 1, wherein the handle assembly defines at least one prehensile-facilitating surface feature.

9. The removable tool of claim 1, wherein the handle assembly is configured to be grasped by a machine.

10. The removable tool of claim 1, wherein the handle assembly is configured to be grasped by a human hand.

* * * * *